United States Patent [19]
Dauber et al.

[11] Patent Number: 5,896,478
[45] Date of Patent: Apr. 20, 1999

[54] ARRANGEMENT FOR RECEIVING AN OPTICAL-FIBRE CONNECTOR, IN PARTICULAR FOR A FLOOR BOX

[75] Inventors: Michael Dauber, Worms; Monika Stein, Darmstadt, both of Germany

[73] Assignee: The Whitaker Corporation, Wilmington, Del.

[21] Appl. No.: 08/958,324

[22] Filed: Oct. 27, 1997

[30] Foreign Application Priority Data

Oct. 30, 1996 [DE] Germany .................. 196 43 928

[51] Int. Cl.$^6$ .................................. G02B 6/36
[52] U.S. Cl. ................ 385/53; 385/55; 439/540.1
[58] Field of Search ........................... 385/53, 54, 55; 439/540.1, 535, 536

[56] References Cited

U.S. PATENT DOCUMENTS 3,972,579  8/1976  Kohaut ........................ 339/34
5,122,069  6/1992  Brownlie et al. ............. 439/131
5,645,449  7/1997  Sabo ........................... 439/540.1

FOREIGN PATENT DOCUMENTS 0 410 588-B1  1/1991  European Pat. Off.
2 746 931    10/1997  France.
196 22 623  12/1996  Germany.

OTHER PUBLICATIONS

European Search Report.

*Primary Examiner*—Phan Palmer

[57] ABSTRACT

An apparatus for receiving an optical-fibre connector comprises an enveloping housing and a receiving housing which is constructed from a first housing part and a second housing part and is mounted in the enveloping housing in a fashion capable of rotating, where cylindrical wall sections of the receiving housing have restricting cams which co-operate with the enveloping housing in such a way that the range of the rotation angles of the optical-fibre connector is restricted.

8 Claims, 4 Drawing Sheets

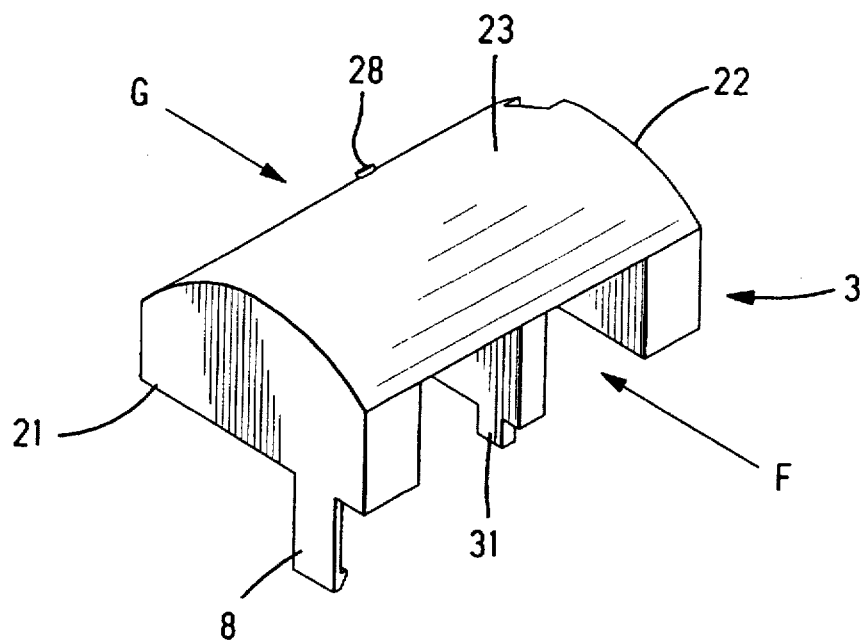
Fig. 3
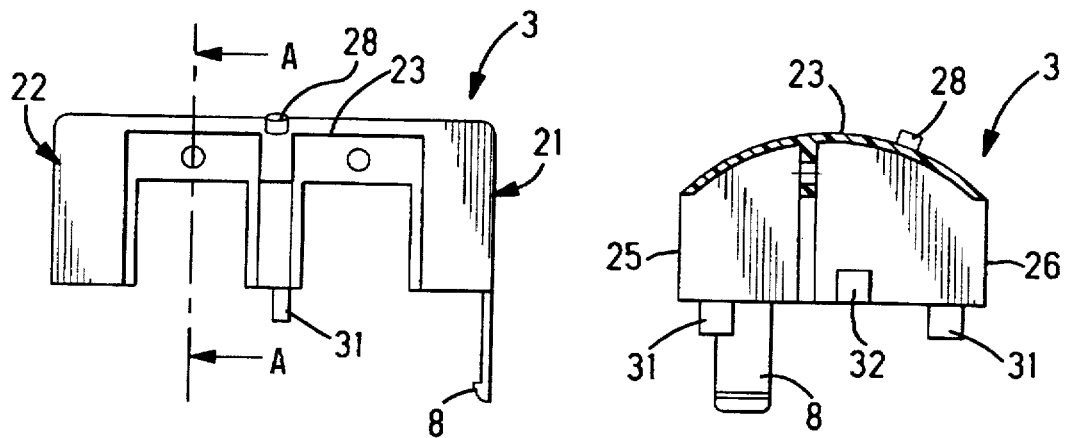
Fig. 4
Fig. 5

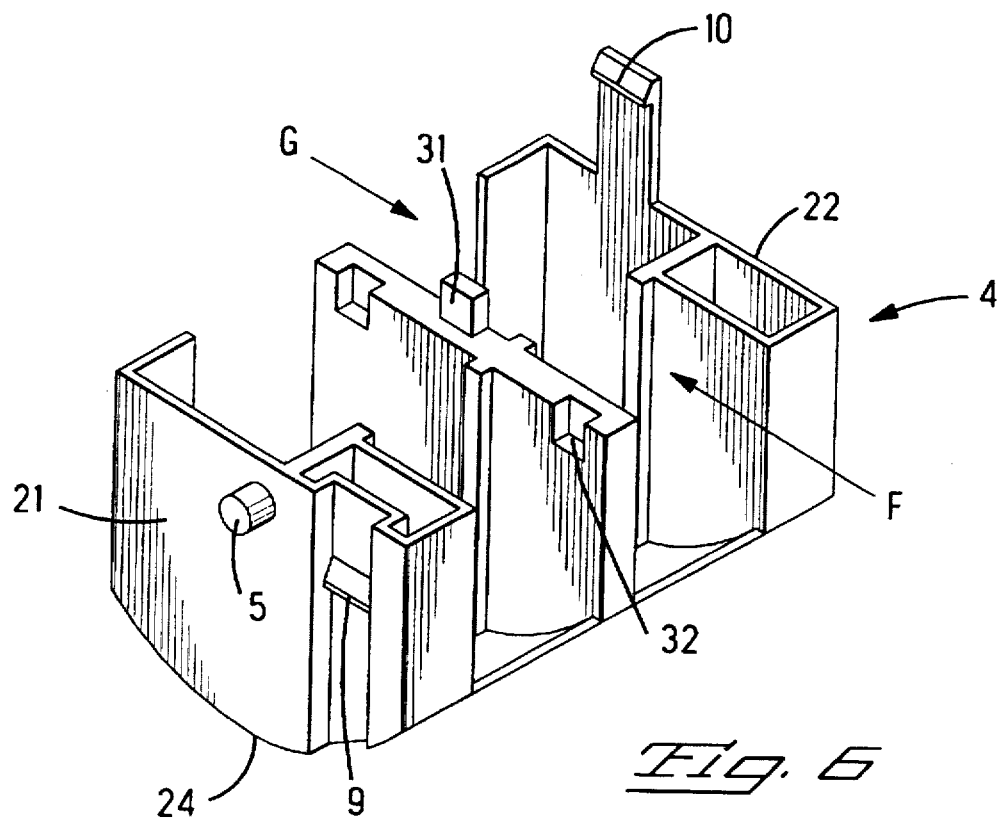
Fig. 6
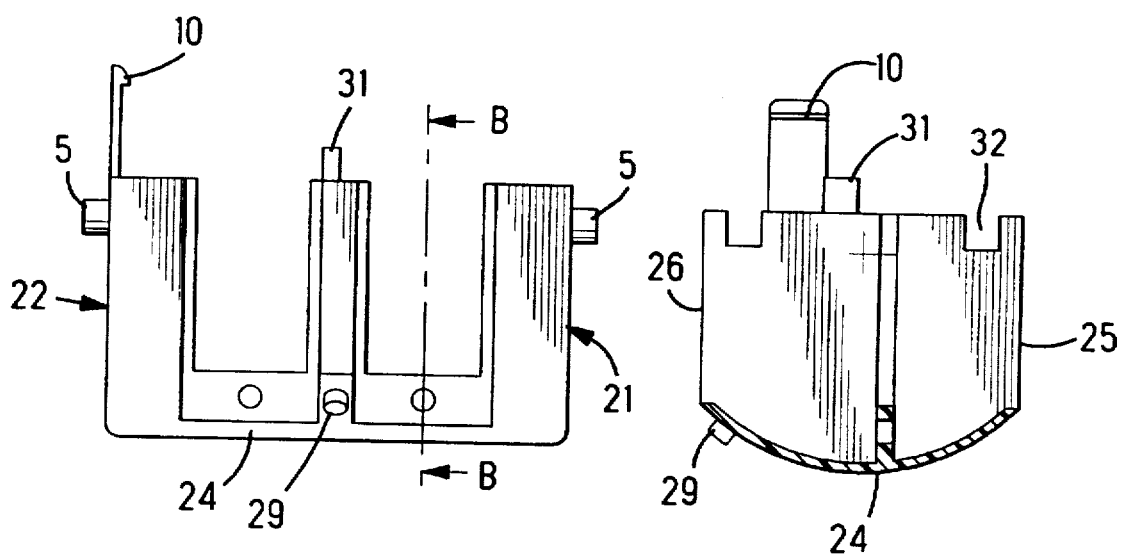
Fig. 7
Fig. 8

ARRANGEMENT FOR RECEIVING AN OPTICAL-FIBRE CONNECTOR, IN PARTICULAR FOR A FLOOR BOX

BACKGROUND OF THE INVENTION

1. Field of the Invention

The invention relates to the general field of optical fibre connectors.

2. Description of the Prior Art

A floor box is disclosed in EP 410 588 B1. In modern offices and in other working spaces, floor boxes are used in order to be able to feed a plurality of power lines and signal lines directly to the various workplaces. Floor boxes are desired in large office spaces, in particular, because here the lines can be laid under the floor to the workplace instead of above the floor. The danger of tripping is excluded and the workplaces can be fitted out independently of the walls. The equipment required at the workplace, such as telephone, computer etc. is no longer connected to the appropriate system via wall-mounted socket-outlets, but close to the workplace beneath the floor box. Different modules for each type of line are arranged in the floor box. EP 410 588 B1 teaches how the modules are arranged movably for the purpose of user friendliness and of greater ease of accessibility. When the system is constructed for optical fibres, it must be borne in mind particularly that the optical fibre is not too tightly bent during the possible movements. Bending the optical fibre too tightly results in attenuation of the signal.

SUMMARY OF THE INVENTION

It is the object of the invention to specify an arrangement for receiving an optical-fibre connector, in particular for a floor box, in which the bending radius of optical fibre does not fall below the minimum value allowed.

The basic idea of the invention is the concentric arrangement in an enveloping housing of an essentially cylindrical receiving housing for optical-fibre connectors. The receiving housing is mounted in the enveloping housing in a fashion capable of rotating about an axis of rotation which is perpendicular to the plug-in direction of the optical fibres, being generally mounted like a roller in a casing. The rotary movement of the receiving housing in the enveloping housing is restricted to a specific angular range by restricting cams. The result of this is that the optical fibre cannot be kinked in the region of the optical-fibre connector. For the purpose of easier assembly of the receiving housing with the optical-fibre connectors, which are intermated in the receiving housing, the receiving housing is constructed in a latchable fashion from two housing parts having complementary latching means.

Careful

This object is achieved in one embodiment by means of an arrangement for receiving an optical-fibre connector, having the following features:

An enveloping housing having side walls arranged perpendicular to an axis, and two wall sections formed concentrically with this axis to form two opposite wall sections of a cylindrical shell, and having an incoming opening and an outgoing opening for the optical fibre; a receiving housing for receiving at least one optical-fibre connector arranged in the enveloping housing in a fashion capable of rotating about the axis in a restricted range of rotation angles; the receiving housing has side walls arranged perpendicular to the axis, and has two wall sections arranged concentrically with the axis to form two opposite wall sections of a cylindrical shell and guide the receiving housing in the enveloping housing, and expose an incoming opening and an outgoing opening for the optical fibre; the receiving housing is constructed in such a way that in each case at least one complementary part of an optical-fibre connector can be received on two opposite sides, the axis of the optical-fibre connector extending perpendicular to the axis of rotation, and the corresponding optical fibres extending in each case through the incoming openings and through the outgoing openings.

It is advantageous that the optical fibres adjacent to the optical-fibre connectors are protected against excessive sag upon introduction into the arrangement. This is achieved by virtue of the fact that the enveloping housing has guide regions which are adjacent to the wall sections and support the optical fibres during passage through the incoming openings and the outgoing openings.

It is further advantageous that the arrangement can be fastened easily to a substrate. This is achieved by virtue of the fact that the enveloping housing has fastening surfaces which are arranged perpendicular to the side walls, and have means for orientating and fastening to a substrate.

It is also advantageous that the arrangement allows the optical-fibre connectors to be mounted easily. This is achieved by virtue of the fact that the receiving housing is assembled from two housing parts, and that the first housing part can be connected to the second housing part by means of latching elements on the first housing part which co-operate with further latching elements on the second housing part.

It is further advantageous that the optical fibres can easily be aligned. This is achieved by virtue of the fact that the second housing part has round pins at the end of the axis of rotation, and that the enveloping housing has bearing bushes, which fit the round pins, in such a way that the receiving housing is mounted in the enveloping housing on the axis of rotation in a fashion capable of rotating transverse to the direction of the optical-fibre connector.

BRIEF DESCRIPTION OF THE DRAWINGS

FIG. 3 shows a perspective view of the first housing part of the receiving housing of FIG. 2, FIG. 4 shows a side view of the first housing part, seen from the side of the outgoing opening (arrow G) of FIG. 3, FIG. 5 shows a section through the first housing part along the line AA of FIG. 4, FIG. 6 shows an upper perspective view of the second housing part of the receiving housing of FIG. 2, FIG. 7 shows a side view of the second housing part, seen from the side of the outgoing opening (arrow G) of FIG. 6, FIG. 8 shows a section through the second housing part along the line BB in FIG. 7.

DETAILED DESCRIPTION OF THE PREFERRED EMBODIMENT

Figure 1:
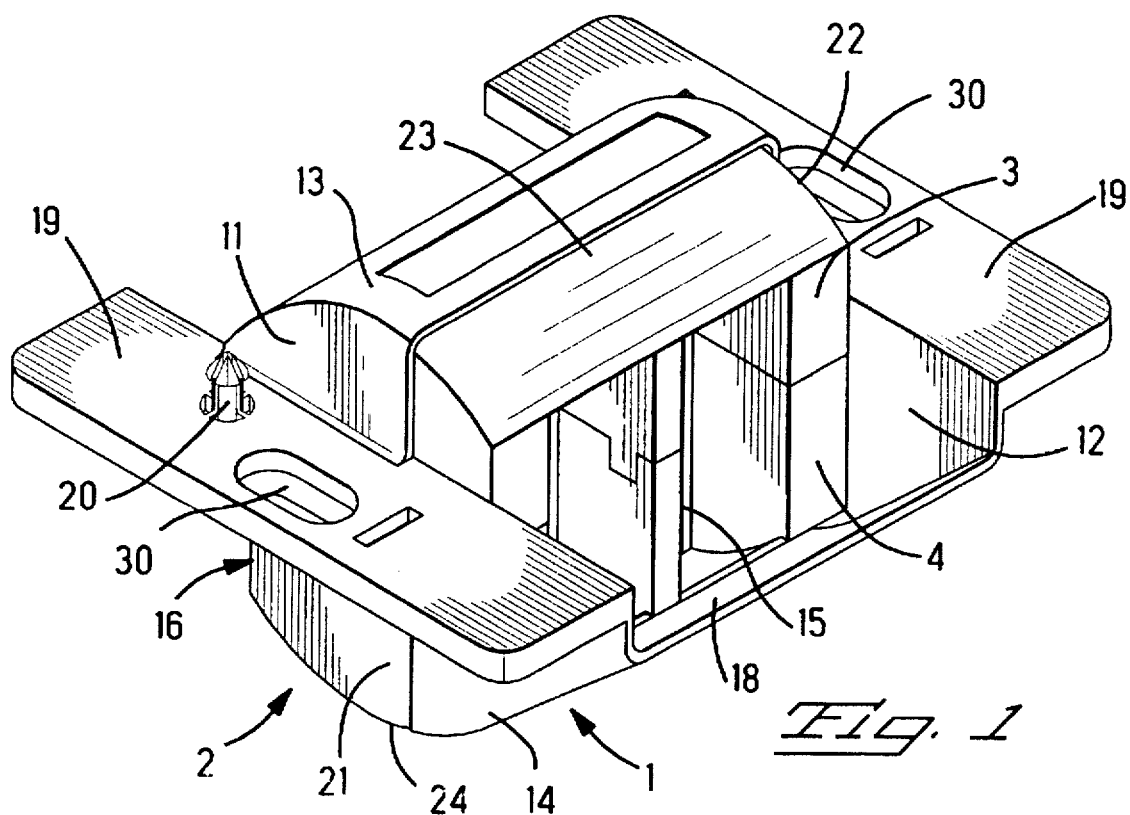
FIG. 1 shows a perspective view of an embodiment of the present invention.

An arrangement for receiving an optical-fibre connector, in particular for a floor box, is represented in FIG. 1. The arrangement comprises an enveloping housing 1 and a receiving housing 2. The arrangement is shown here without an optical fibre and without a surrounding floor box. The enveloping housing 1 is represented with the receiving housing 2 removed in FIG. 9, and the receiving housing 2 is represented without the enveloping housing 1 in FIG. 2. The receiving housing 2 is arranged in the enveloping housing 1 in a fashion capable of rotating about an axis.

Figure 9:
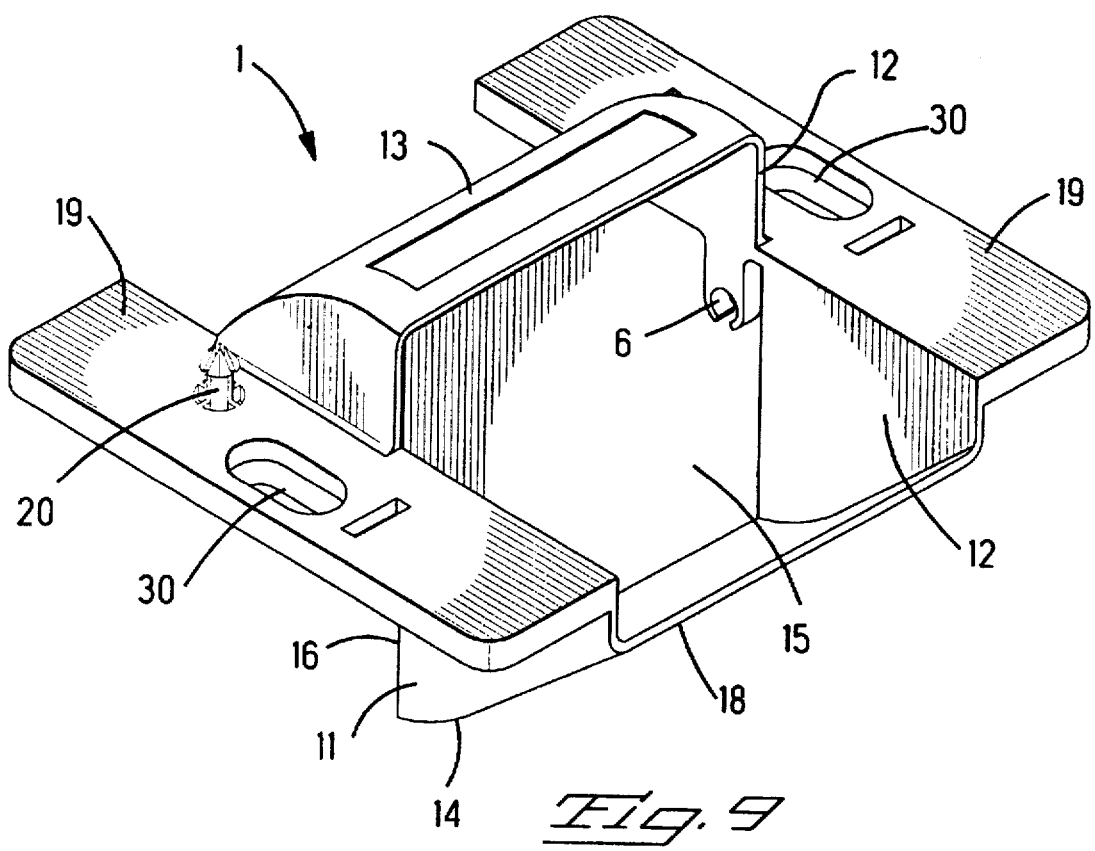
FIG. 9 shows a perspective view of the enveloping housing corresponding to FIG. 1 with the receiving housing removed.

It is to be seen in FIG. 1 and better in FIG. 9, that the enveloping housing 1 has two side walls 11, 12 perpendicular to the axis of rotation about which the receiving housing 2 is pivotably attached. The enveloping housing 1 has wall sections 13, 14 fashioned concentrically with the axis of rotation. The wall sections 13, 14 form two opposite wall sections of a cylindrical shell, and connect the first side wall 11 to the second side wall 12. An incoming opening 15 and an outgoing opening 16 for the optical fibre are exposed between the wall sections 13, 14 on the circumference of the cylindrical shell. On two opposite sides, the enveloping housing 1 has fastening surfaces 19 which are arranged perpendicular to the side walls 11, 12. The fastening surfaces 19 have fasteners 20, 30 for aligning and for fastening, by means of which the enveloping housing 1 can be aligned with a floor box (not shown here) and fastened. The fasteners 20, 30 are for aligning and fastening and represented here as a post and as an elongated hole.

It is to be seen in FIG. 1 that a guide region 18 is arranged adjacent to the wall section 14. The guide region 18 serves the purpose of enabling the optical fibre to be fed evenly into the incoming opening 15 of the housing 1. The receiving housing 2 for receiving an optical-fibre connector can be rotated about the axis of rotation in the enveloping housing 1 in a restricted range of rotation angles, thereby accommodating the paths of the optical fibres.

Figure 2:
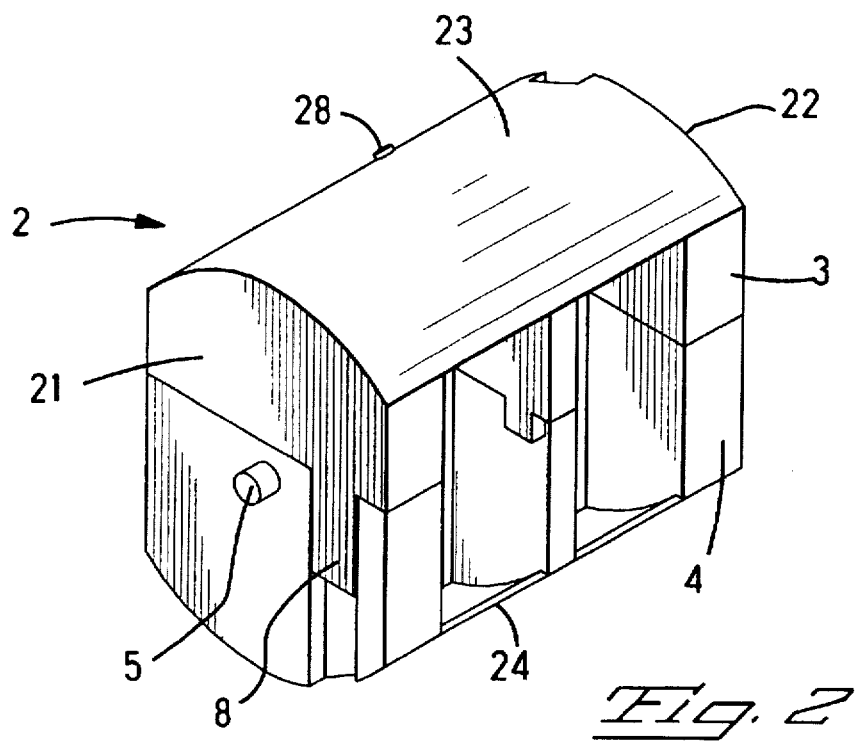
FIG. 2 shows a perspective view of the receiving housing.

It is to be seen in FIG. 1 and better in FIG. 2 how the receiving housing 2 is assembled from a first housing part 3 and a second housing part 4. Round pins 5 are formed in side walls 21, 22. The axis of rotation, about which the receiving housing 2 is arranged and capable of rotation in the enveloping housing 1, extends through the round pins 5. The receiving housing 2 has two side walls 21, 22 arranged perpendicular to the axis of rotation. The receiving housing 2 has two wall sections 23, 24 which are arranged concentrically with the axis of rotation, form two opposite wall sections of a cylindrical shell, and are fastened to the side walls 21, 22.

Arranged on side wall 21 is a latching element 8, and arranged on the opposite side wall 22 is a further latching element. The first housing part 3 is connected to the second housing part 4 by means of the latching elements 8. The round pin 5 can be received by a bearing bush 6 of the enveloping housing 1, shown in FIG. 9.

The first housing part 3 is represented in perspective in FIG. 3; a side view of the first housing part 3 is represented in FIG. 4; and, a section along the line AA of FIG. 4 through the first housing part 3 is represented in FIG. 5. The first housing part 3 has portions of vertical side walls 21, 22. The portions of side wall 21, 22 are connected to one another via a cylindrical wall section 23. The first housing part 3 includes an incoming opening 25 and an outgoing opening 26 for the optical fibres. Arranged on the portion of complementary side wall 21 is a latching element 8, and a further latching element is arranged on the opposite portion of side wall 22. The first housing part 3 has pins 31 and cutouts 32 for connecting with the second housing part 4. As may be seen in FIGS. 3, 4 and 5, the cylindrical wall section 23 has a movement restricting pin 28. The movement restricting pin 28 co-operates with the enveloping housing 1 in such a way that the rotation angle of the receiving housing 2 in the enveloping housing 1 is restricted. As a result, the optical fibre cannot become kinked in the region of the connector as the bending radius of the optical fibre is restricted so that attenuation of the signal is prevented. The arrow F represents the optimum course of the optical fibre to the incoming opening 25 of the receiving housing 2, and the arrow G likewise represents the optimum course of the optical fibre from the outgoing opening 26 of the receiving housing 2.

The second housing part 4 is represented in FIGS. 6, 7 and 8 where FIG. 6 shows the second housing part 4 in a perspective representation; FIG. 7 shows a view of the second housing part 4; and, FIG. 8 shows a section along the line BB of FIG. 7. Like the first housing part 3, the second housing part 4 also has portions of side walls 21, 22. These portions of side walls 21, 22 are connected to one another via cylindrical wall section 24. In FIG. 6, a round pin 5 is visible on the portion of side wall 21, and in FIG. 7 a further round pin 5 is visible on the opposite portion of side wall 22. The axis of rotation, about which the receiving housing 2 when mounted in the enveloping housing 1 extends through these round pins 5. The side wall 21 of the second housing part 4 has a latching means 9 which co-operates with the latching means 8 of the first housing part 3, and located on the opposite side wall 22 is a further latching means 10 similar to latching means 8, which co-operates with further latching means similar to latching means of the first housing part 3. In addition, the second housing part 4 has further pins 31 and further cutouts 32, which co-operate with the pins 31 and cutouts 32 of the first housing part 3.

Figure 10:
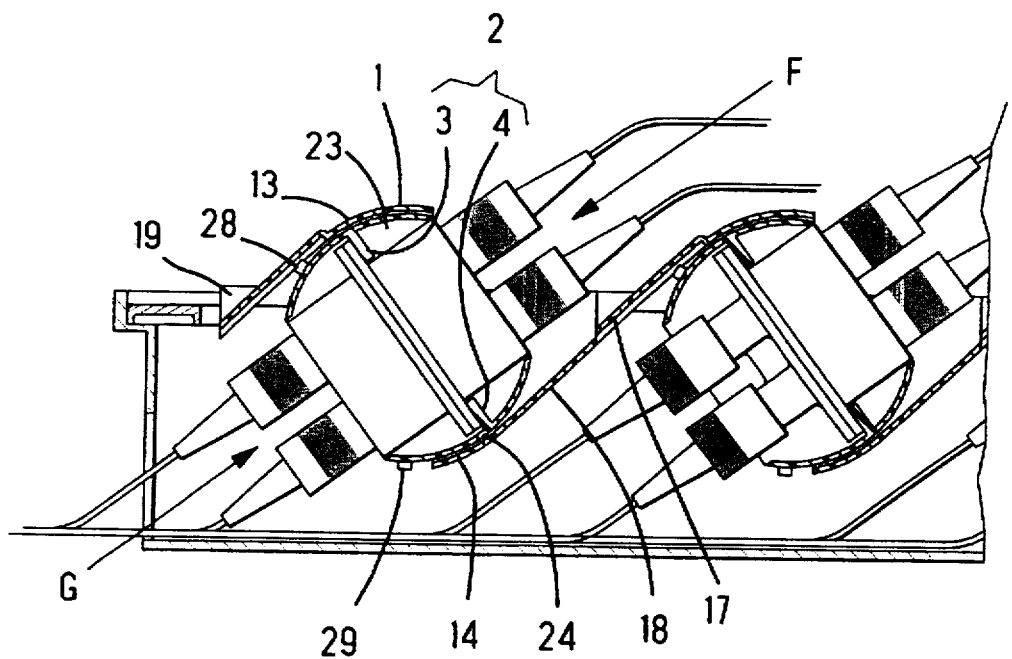
FIG. 10 shows a section through the arrangement in accordance with the present invention, installed in a floor box and provided with an optical-fibre connector.

When comparing the second housing part 4 from FIG. 6 with the first housing part 3 from FIG. 2, the first housing part 3 is smaller than half of the receiving housing 2 and the second housing part 4 is larger than half of the receiving housing 2. This enables the round pins 5 to be arranged on the axis of rotation of the receiving housing 2. As a result, the bearing points of the receiving housing 2 is accurately defined, and the required precision is ensured. In FIGS. 3, 6 and 10, the arrow F represents the optimum course of the optical fibre to the incoming opening 25 of the receiving housing 2, and the arrow G likewise represents the optimum course of the optical fibre from the outgoing opening 26 of the receiving housing 2.

As seen in FIG. 9 is a bearing bush 6, which has already been mentioned in the discussion of FIG. 1, is arranged on the side wall 12, facing the receiving housing 2, of the enveloping housing 1, and co-operates with the round pin 5 for the purpose of mounting the receiving housing 2 in the enveloping housing 1 in a fashion capable of rotating about the defined axis. The arrangement of the round pins 5 on the receiving housing 2, and of the bearing bushes 6 on the enveloping housing 1 is exchangeable. In an embodiment which is not shown, the round pins can be arranged on the enveloping housing, and the bearing bushes can be arranged on the receiving housing. It may also be seen in FIG. 1 and FIG. 9 how a guide region 18 is arranged adjacent to the cylindrical wall section 14.

As seen in FIG. 9 how the enveloping housing 1 has side walls 11, 12 arranged perpendicular to the axis of rotation. A portion of each side wall 11, 12 is arranged above and below respective fastening surfaces 19. Wall sections 13, 14 are fastened to the side walls 11, 12 and are arranged concentrically with this axis. The wall sections 13, 14 form two opposite wall sections of a cylindrical shell.

In the section of FIG. 10, the second cylindrical wall section 13 of the enveloping housing 1 has a guide region 17.

The effect of the guide regions 17, 18 is that the optical fibre cannot become kinked in the region of the connector, and can be guided evenly into the enveloping housing 1 and out of the enveloping housing 1. The receiving housing 2 for receiving an optical-fibre connector can be rotated about the axis of rotation in the enveloping housing 1 in a restricted range of rotation angles.

In FIG. 10 is represented a section through a part of a floor box is represented. Two arrangements for receiving an optical-fibre connector are arranged next to one another in FIG. 10. The aim of this is to show that a plurality of optical-fibre connectors can be arranged in one floor box. In the section of FIG. 10, the arrow F shows how the optical fibre comes into the optical fibre connector, and the arrow G shows how the optical fibre goes out from the optical-fibre connector. The cylindrical wall sections 13, 14, and the guide regions 17, 18 of the enveloping housing 1 are to be seen in section. Likewise to be seen is the fastening surface 19, by means of which the enveloping housing is fastened in the floor box. The restricting cams 28, 29 are likewise to be seen on the receiving housing 2 in the section of FIG. 10. The restricting cams 28, 29 co-operate with the enveloping housing 1 in such a way that the range of rotation angles of the optical-fibre connector is restricted.

We claim:

1. An apparatus through which connectors on cables on opposite sides of a partition can be attached therethrough; the apparatus comprising an enveloping housing having opposing side walls spanned by two opposite wall sections defining opposing incoming and outgoing openings, mounting members attached to each side wall thereby defining an axis about which an inner curved surface on each opposite wall section is commonly defined; and a receiving housing contained within the enveloping housing between the opposite wall sections, the receiving housing having end walls with a complementary mounting member to the mounting member of the enveloping housing attached thereto, a pair of oppositely disposed wall sections spanning the end walls having outer surfaces complementary to the inner curved surfaces to guide the receiving housing within the enveloping housing; where the receiving housing further includes incoming and outgoing openings for receiving the connectors therein that correspond to the incoming and outgoing openings of the enveloping housing, where the receiving housing is pivotable about the axis within the enveloping housing to accommodate cable alignment perpendicular to the axis.

2. The apparatus according to claim 1, wherein the enveloping housing has guide regions adjacent to the wall sections and openings in such a way that the optical fibres are guided into the enveloping housing and guided out of the latter.

3. The apparatus according to claim 2, wherein the enveloping housing has fastening surfaces arranged perpendicular to the side walls.

4. The apparatus according to claim 3, wherein on the fastening surfaces the enveloping housing has means for aligning with and fastening to a floor box.

5. The apparatus according to claim 1, wherein the receiving housing is assembled from two housing parts.

6. The apparatus according to claim 5, wherein the first housing part can be connected to the second housing part by means of latching elements on the first housing part which co-operate with further latching elements on the second housing part.

7. The apparatus according to claim 1, wherein on the two opposite wall sections of the receiving housing have restricting cams which operate with the wall sections of the enveloping housing in such a way that the rotation angle of the receiving housing in the enveloping housing is restricted.

8. The apparatus according to claim 1, wherein round pins and, respectively, bearing bushes fitting the latter are arranged on the second housing part of the receiving housing and on the enveloping housing in such a way that the receiving housing is mounted in the enveloping housing on the axis of rotation in a fashion capable of rotating transverse to the direction of the optical-fibre connector.

* * * * *